Oct. 20, 1970     A. F. STAMM     3,535,002
TUBULAR AXLE STRUCTURE AND METHOD OF MAKING
Filed June 3, 1969     3 Sheets-Sheet 1
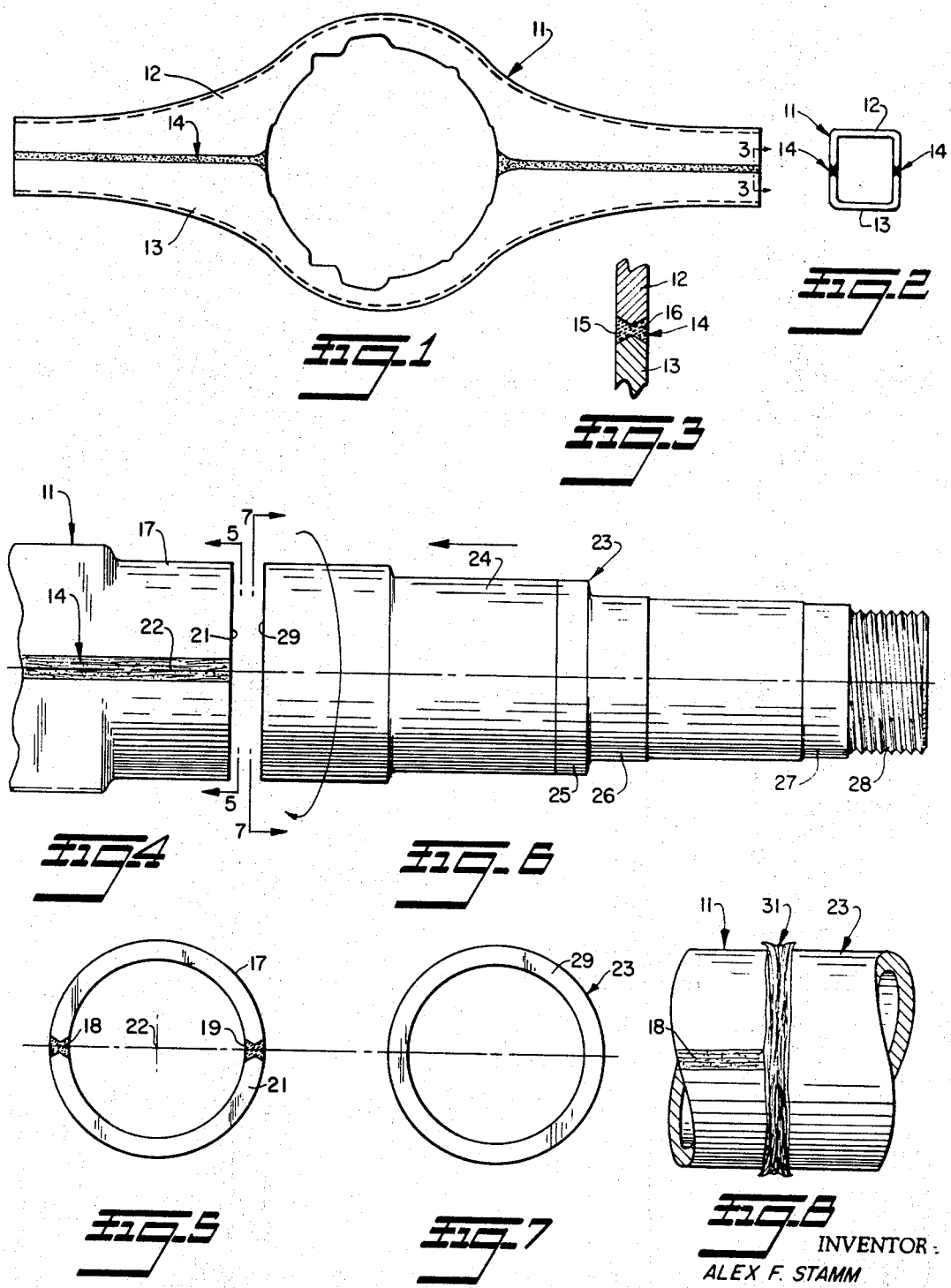
INVENTOR:
ALEX F. STAMM

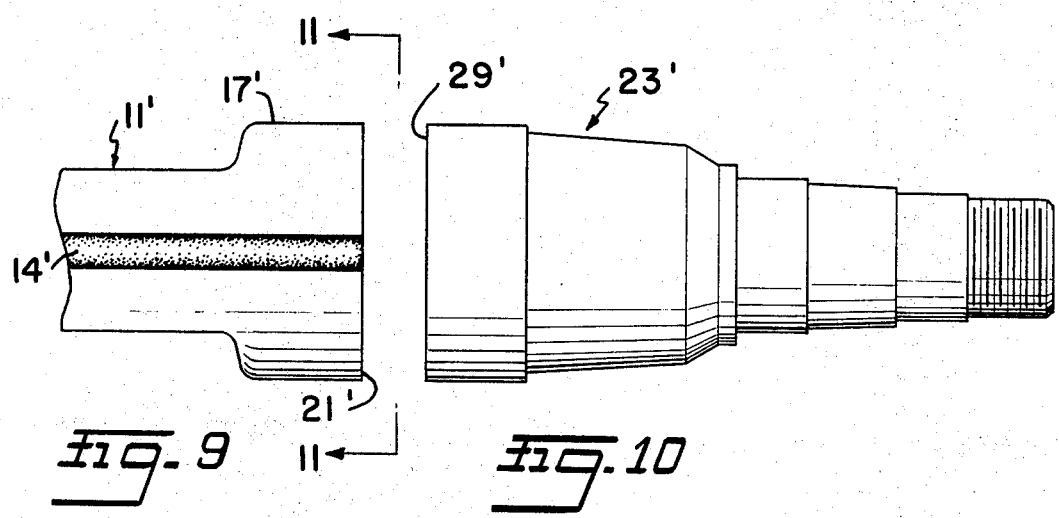

Oct. 20, 1970  A. F. STAMM  3,535,002
TUBULAR AXLE STRUCTURE AND METHOD OF MAKING
Filed June 3, 1969  3 Sheets-Sheet 3
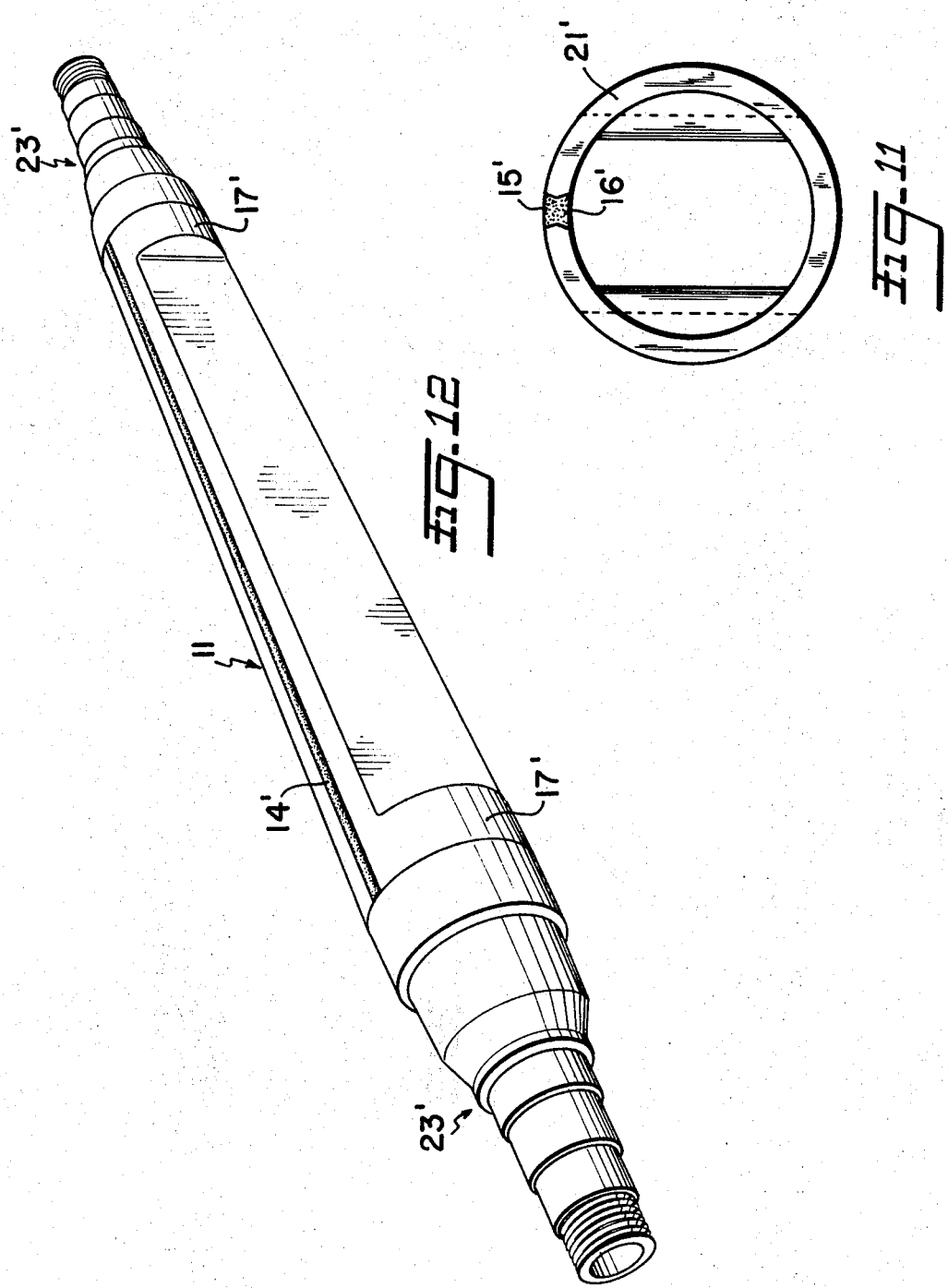

United States Patent Office 3,535,002
Patented Oct. 20, 1970

3,535,002
TUBULAR AXLE STRUCTURE AND
METHOD OF MAKING
Alex F. Stamm, Rochester, Mich., assignor to North American Rockwell Corporation, Pittsburgh, Pa., a corporation of Delaware
Continuation-in-part of application Ser. No. 650,507, June 30, 1967. This application June 3, 1969, Ser. No. 830,085
Int. Cl. B60b 35/08, 35/16
U.S. Cl. 301—124                                 4 Claims

ABSTRACT OF THE DISCLOSURE

A tubular axle structure includes a center section having cylindrical end portions and wheel bearing end spindles friction welded upon the opposite ends of the center section, the center section having at least one pair of abutting longitudinally extending edges secured together throughout their abutting lengths and having at least at the opposite ends of the abutting edges through weld regions. The method of making the axle structure includes the steps of shaping the center section, welding the abutting longitudinal edges together to produce through weld regions at least at the opposite ends of the abutting edges, and friction welding the wheel bearing end spindles onto the cylindrically shaped end portions.

This application is a continuation-in-part of copending application Ser. No. 650,507, for "Tubular Axle Structure and Method of Making," filed on June 30, 1967, now abandoned in the name of the inventor of this application and assigned to the assignee of this application.

Various ways have been proposed for forming tubular drive axle housings and trailer axle beams from sheet metal. For example, Schneider et al. Pat. No. 2,674,783 shows a drive axle housing where the center section is formed of opposed U-cross-section halves welded along side seams and having opposite ends butt welded to wheel bearing sleeves. Buckendale Pat. No. 2,685,479 discloses a tubular trailer axle beam wherein U-shaped halves are welded along longitudinal side seams and the wheel bearing components are butt welded to opposite ends.

To applicant's knowledge prior to the invention no one has successfully friction welded wheel bearing sleeves to such seam welded tubular center sections, and it is the major object of the invention to provide a novel method of accomplishing this and producing a novel article.

It is a more specific object of this invention to provide a tubular axle structure such as a drive axle housing or a trailer axle beam wherein abutting longitudinal edges of a center section are welded together such that through weld regions are provided at least at the opposite ends of the abutting edges and wherein wheel bearing end spindles are thereafter friction welded onto the opposite through welded ends of the center section. In accordance with preferred embodiments of the invention, the abutting longitudinal edges are welded together by both inside and outside seam welds, the outside seam welds extending the entire length of the center section and the inside welds being provided at least at the ends so that the ends are thereby through welded.

While the invention is distinctly claimed and particularly pointed out in the claims appended hereto, the invention will be better understood and appreciated, along with other objects and features thereof, by reference to the following detailed description of preferred embodiments when considered in conjunction with the accompanying drawings in which:

FIG. 1 is a side elevation showing one form of drive axle housing component in an early stage of manufacture;

FIG. 2 is an end view of the housing component of FIG. 1;

FIG. 3 is an enlarged fragmentary section taken along viewing line 3—3 of FIG. 2 showing the through weld region at the end of the housing component;

FIG. 4 is a fragmentary side elevation showing the housing component of FIG. 1 following a further operation wherein the ends have been swaged to cylindrical form;

FIG. 5 is an end view of the component of FIG. 4 taken along viewing line 5—5 of FIG. 4;

FIG. 6 is a side elevation of a wheel bearing spindle component positioned to be friction welded to the swaged end of the axle housing center section of FIG. 4;

FIG. 7 is an end view of the component of FIG. 6 taken along viewing line 7—7 of FIG. 6;

FIG. 8 is a fragmentary side elevation showing the friction welded joint formed when the wheel bearing spindle component of FIG. 6 is friction welded to the housing component of FIG. 4;

FIG. 9 is a view similar to FIG. 4 showing a fragmentary plan view of the housing component of a trailer axle;

FIG. 10 is a view similar to FIG. 6 showing a wheel bearing spindle component positioned to be friction welded to the swaged end of the axle center housing component of FIG. 9;

FIG. 11 is an end view of the housing component of FIG. 9 taken along viewing line 11—11 of FIG. 9 showing the through weld region of the single longitudinal weld; and FIG. 12 is a perspective view of a fully assembled trailer axle formed in accordance with the invention, the wheel bearing spindle components of FIG. 10 having been friction welded onto opposite ends of the housing component of FIG. 9.

FIGS. 1 and 2 show the center section 11 of a drive axle housing that consists of two formed half members 12 and 13 that are of generally U-shape in cross-section and permanently secured together by similar parallel seam welds 14 along opposite sides.

Center section 11 is preferably made by conventional methods and in apparatus similar to that disclosed in Schneider Pat. No. 2,674,783. Each half 12 and 13 is formed as by stamping or forging from sheet steel blank, and then two formed halves as secured in a welding fixture with their open side edges in abutment and weld seams 14 are formed.

In the present invention, it is particularly important that, instead of merely the outside seam weld disclosed in said Schneider et al. patent, the seam 14 be through welded at least at the ends of the center section 11 and preferably throughout the length of the seam 14. In this manner, there will be no non-welded edge surfaces of the housing halves 12 and 13 at the ends where, as will be described presently, the center section is friction welded to wheel bearing and spindles 23. As illustrated by FIG. 3, it has been found that a through weld region can be suitably formed by intersecting welds 15 and 16 made from both the outside and inside of the center section 11. Other forms of producing a through weld having, as illustrated by FIG. 3, substantial thickness at the internal surface as well as the external surface will also occur to those skilled in the art.

After welding to the form shown in FIGS. 1–3, the housing center section is swaged at both ends to form cylindrical end regions 17 such as illustrated at FIG. 4, FIG. 5 showing the shape of each such end region as a hollow cylinder. As also shown in FIG. 5, the through welded seams indicated at 18 and 19 are radially continuous through the housing wall so that there are no non-welded edge surfaces at the ends of the center section 11.

Each end face 21 of the axle housing center section is machined flat and fairly smooth to lie in a plane at right angles to the longitudinal axis 22 of the housing.

Referring now to FIG. 6, two wheel bearing end spindles 23 are provided for being friction welded to the axle housing center section. These spindles are hollow members usually formed by suitable mechanical operations from an integral steel tube or billet. As shown in FIG. 6, each spindle 23 may comprise a cylindrical portion 24 on which a brake spider may be welded, a cylindrical seal mounting portion 25, inner and outer cylindrical wheel bearing mounting portions 26 and 27 respectively and a threaded end 28 for mounting retainers. In some embodiments the brake spider may be welded onto the cylindrical housing region 17, but the invention is independent of such detail.

As shown in FIG. 7, the inner cylindrical end of spindle 23 has a flat smooth friction welding surface 29 that is disposed in a plane at right angles to the spindle axis.

In the invention, the wheel bearing end spindles 23 are friction welded onto the opposite ends of the axle housing center section 11. The two spindles may be welded to the center section simultaneously or in a desired sequence. In the drawings, FIGS. 4 and 6 are laterally aligned in the preferred arrangement for friction welding one of the spindles 23 to the center section 11, the spindle axis aligned with housing axis 22 and the housing being clamped against movement by means not illustrated. End surfaces 21 and 29 are parallel. The spindle 23 is clamped to a rotating assembly on a suitable carrier, not shown, and advanced as shown by the arrow while rotating to engage surfaces 21 and 29 in rubbing contact under axial pressure, the housing and spindle regions adjacent the surfaces 21 and 29 being heated and thereafter fusing together when relative rotation is stopped to thereby form the completed friction weld joint 31 shown in FIG. 8.

Preferably the friction welding is carried out in apparatus such as disclosed in copending patent application Ser. No. 650,317, filed on June 30, 1967, for "Friction Welding Apparatus" in the name of Arthur F. Gage and assigned to the assignee of this invention, and reference is made thereto for any further detail needed to understand the friction welding process.

It is an essential and critical feature of the invention that the longitudinal seam welds of the axle housing center section extend entirely radially through the welded seam at and adjacent the end face 21 where the friction weld is performed. Experience has shown that unless through welds are provided here, the friction weld joint will contain cracks and like flaws that contribute to reduced strength and shorter life of the axle housing.

The invention can also be applied to tubular non-drive axle beams such as the trailer axle structure of FIGS. 9–12. In the trailer axle of FIGS. 9–12, the center section 11' is fabricated from a single piece of sheet metal formed into the illustrated rectangular shape, the abutting edges of the single sheet of metal then being joined by a single weld seam 14' extending the entire length of the center section 11'. The single seam 14' is preferably a through weld throughout its length and necessarily a through weld at the ends of the center section 11' as illustrated by FIG. 11. More particularly, the weld 14' as illustrated by FIG. 11 is formed by intersecting inside and outside welds 16' and 15'. As in the case of the axle of FIGS. 1–8, the ends of the center section 11' are swaged to form cylindrical end regions 17', and the end faces 21' are machined flat. Spindles 23' having flat end faces 29' are then friction welded to the ends of the center section 11'. Again, it is essential that the single seam weld 14' extend entirely radially through the housing wall at the end face 21' where friction welding is performed in order to produce a friction weld of high strength and long life.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description.

What is claimed as new and is desired to secure by Letters Patent is:

1. A hollow tubular axle structure comprising a center section consisting of two axle members of generally U-shape in cross-section intermediate their ends and connected by transition sections with cylindrical end sections secured together at their open edges along longitudinal seams having at least at the opposite ends of said members intersecting inside and outside welds that provide through weld regions at the end of each seam, and hollow wheel bearing end spindles having corresponding cylindrical ends friction welded upon the opposite end sections of said center section.

2. The method of making a tubular axle structure which comprises providing a welded center portion by the steps of assembling two longitudinally extending components of substantially U-shape in cross-section in opposed relation with the edges of the open sides thereof in contact along parallel lines, exteriorly welding said components together all along said lines, internally welding said components together at least at the opposite end sections whereby through weld seams are formed at said opposite end sections, shaping at least the terminal ends of said end sections of said welded center portion to cylindrical form, and friction welding cylindrical wheel bearing end spindles onto said shaped end sections.

3. The method of making a tubular axle which comprises the steps of forming sheet metal into a hollow center portion having at least one pair of abutting longitudinally extending edges, externally welding said pair of edges together along their entire abutting length, welding said pair of edges together internally at least at the opposite end sections whereby through weld seams are formed at said opposite end sections, shaping at least the terminal ends of said end sections of said welded center portion to cylindrical form, and friction welding cylindrical wheel bearing end spindles onto said shaped end sections.

4. A hollow tubular axle structure comprising a center section having a central portion of predetermined cross-section intermediate its ends connected by transition portions with cylindrical end portions, said center section having at least one pair of abutting longitudinally extending edges secured together throughout their entire abutting lengths and having at least at the opopsite ends of the abutting edges intersecting inside and outside welds that provide through weld regions at said ends, and hollow wheel bearing end spindles having corresponding cylindrical ends friction welded upon the opposite ends of said center section.

References Cited
UNITED STATES PATENTS

| 2,204,287 | 6/1940  | Wilber     | 74—607   |
| 2,477,576 | 8/1949  | Buckendale | 74—607   |
| 2,569,452 | 10/1951 | Buckendale | 74—607   |
| 3,015,238 | 1/1962  | Williams   | 74—607   |
| 3,238,612 | 3/1966  | Herman     | 29—470.3 |

RICHARD J. JOHNSON, Primary Examiner

U.S. Cl. X.R.

29—470.3; 74—607